US009213418B2

(12) United States Patent
Jiang et al.

(10) Patent No.: US 9,213,418 B2
(45) Date of Patent: Dec. 15, 2015

(54) COMPUTER INPUT DEVICE

(71) Applicants: Peigen Jiang, Sammamish, WA (US); Jian Sun, Beijing (CN)

(72) Inventors: Peigen Jiang, Sammamish, WA (US); Jian Sun, Beijing (CN)

( * ) Notice: Subject to any disclaimer, the term of this patent is extended or adjusted under 35 U.S.C. 154(b) by 0 days.

(21) Appl. No.: 14/259,157

(22) Filed: Apr. 23, 2014

(65) Prior Publication Data

US 2015/0309586 A1  Oct. 29, 2015

(51) Int. Cl.
*G06F 3/02* (2006.01)

(52) U.S. Cl.
CPC .................... *G06F 3/0202* (2013.01)

(58) Field of Classification Search
CPC ... G06F 3/0202; G06F 3/0213; G06F 3/0219; G06F 3/0227; G06F 3/03545; G06F 3/0421; G06F 3/0488; G06F 3/04886; G06F 3/0489; H03K 17/969
See application file for complete search history.

(56) References Cited

U.S. PATENT DOCUMENTS

| | | | |
|---|---|---|---|
| 4,311,990 A * | 1/1982 | Burke | 341/31 |
| 4,417,824 A * | 11/1983 | Paterson et al. | 400/477 |
| 5,605,406 A * | 2/1997 | Bowen | 400/472 |
| 2004/0041791 A1* | 3/2004 | Dunker | 345/168 |
| 2004/0104894 A1* | 6/2004 | Tsukada et al. | 345/168 |
| 2004/0159779 A1* | 8/2004 | Duff | 250/221 |
| 2010/0253634 A1* | 10/2010 | Lin et al. | 345/170 |
| 2010/0277413 A1* | 11/2010 | Wang et al. | 345/168 |
| 2011/0128234 A1* | 6/2011 | Lipman et al. | 345/173 |
| 2012/0001873 A1* | 1/2012 | Wu et al. | 345/175 |
| 2012/0013272 A1* | 1/2012 | Huang et al. | 315/312 |
| 2012/0032887 A1* | 2/2012 | Chiu et al. | 345/168 |
| 2012/0081283 A1* | 4/2012 | Lee et al. | 345/157 |
| 2012/0182215 A1* | 7/2012 | Han et al. | 345/156 |
| 2013/0076635 A1* | 3/2013 | Lin | 345/169 |
| 2013/0169534 A1* | 7/2013 | Jiang | 345/158 |
| 2013/0202488 A1* | 8/2013 | Langer et al. | 422/69 |
| 2014/0132516 A1* | 5/2014 | Tsai et al. | 345/168 |
| 2014/0176435 A1* | 6/2014 | Jiang | 345/158 |
| 2014/0327618 A1* | 11/2014 | Jiang | 345/160 |
| 2014/0327620 A1* | 11/2014 | Jiang | 345/163 |

\* cited by examiner

*Primary Examiner* — Joe H Cheng

(57) ABSTRACT

A computer input method is described which comprises providing a plurality of light emitting and receiving devices for detecting one or more touches on a first area of a computer keyboard, coarsely scanning the first area using the plurality of light emitting and receiving devices when no contact on the first area being detected, and densely scanning a second area using a subset of the plurality of light emitting and receiving devices when one or more contact on the first area being detected, the second area being smaller than and situated within the first area.

15 Claims, 6 Drawing Sheets

COMPUTER INPUT DEVICE

BACKGROUND

The present invention relates generally to human input devices for computing systems, and, more particularly, to a computer keyboard and mouse combo device.

One of the most popular ways to position a cursor on a computer display is to use a mouse, which functions by detecting two dimensional motions relative to its supporting surface. Physically, a mouse comprises an object held under one of a user's hands, with one or more buttons. Clicking or hovering (stopping movement while the cursor is within the bounds of an area) can select files, programs or actions from a list of names, or (in graphical interfaces) through small images called "icons" and other elements. For example, a text file might be represented by a picture of a paper notebook, and clicking while the cursor hovers over this icon may cause a text editing program to open the file in a window.

While conventional mice or touchpad can be highly accurate and capable pointing devices for computers, being a separate device they have some short-comings, such as every time when a computer user wants to move a cursor, he or she has to move his or her hand away from the keyboard and to the mouse, and move the mouse as a physical object. It is not only less efficient but also may cause injury to the hand over an extended period of time of use.

On the other hand, a conventional keyboard can only detect pressing of a key thereof, but cannot detect mere touches on the keys. Here, the "touch" refers to a surface of the keyboard being contacted by an object regardless if the key is pressed or not. If the conventional keyboard is a tactile one, the key pressing is a result of the key being depressed. If the conventional keyboard is a surface one, such as Touch Cover in Microsoft Surface, the key pressing is a result of a force being applied on the key. As long as the key remains depressed in tactile keyboard or forced upon in surface keyboard, the key is pressed.

As such, what is desired is a computer input device that can perform both keyboard and mouse functions without relying on moving any additional object other than a user's fingers.

SUMMARY

A computer input method is described which comprises providing a plurality of light emitting and receiving devices for detecting one or more touches on a first area of a computer keyboard, coarsely scanning the first area using the plurality of light emitting and receiving devices when no contact on the first area being detected, and densely scanning a second area using a subset of the plurality of light emitting and receiving devices when one or more contact on the first area being detected, the second area being smaller than and situated within the first area.

The construction and method of operation of the invention, however, together with additional objects and advantages thereof, will be best understood from the following description of specific embodiments when read in connection with the accompanying drawings.

Figure 1:
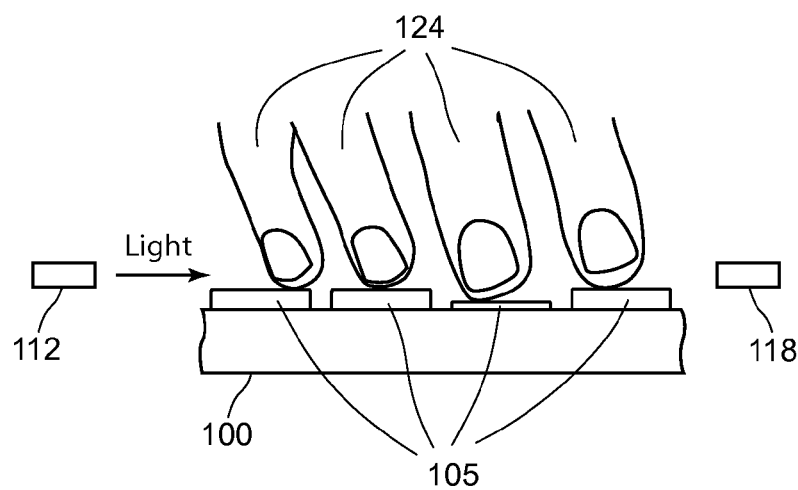
FIG. 1 illustrates an optical touch sensing system positioned to detect touches on the surface of a keyboard.

The drawings accompanying and forming part of this specification are included to depict certain aspects of the invention. A clearer conception of the invention, and of the components and operation of systems provided with the invention, will become more readily apparent by referring to the exemplary, and therefore non-limiting, embodiments illustrated in the drawings, wherein like reference numbers (if they occur in more than one view) designate the same elements. The invention may be better understood by reference to one or more of these drawings in combination with the description presented herein.

DESCRIPTION

The present invention relates to a computer input device utilizing a touch sensing device and a conventional keyboard to provide both keyboard and mouse functions for the computer. The conventional keyboard generally refers to those tactile keyboards with permanent keys. On-screen keyboards are not conventional keyboard at least for the reason that the keys are not permanent. Embodiments of the present invention will be described hereinafter with reference to the attached drawings.

FIG. 1 illustrates an optical touch sensing system positioned to detect touches on the surface of a keyboard 100. The keyboard 100 is a conventional tactile keyboard with a plurality of tactile keys 105. The optical touch sensing system includes a light emitter 112 and light receiver 118. The light emitted from the lighter emitter 112 travels above the surface of the keyboard keys 105 to reach the lighter receiver 118. However when fingers 124 or any other object touches the surface of the keys 105, the light can be blocked from reaching the light receiver 118. As a result, the touch can be detected.

In embodiments, the light emitter 112 is a light emitting diode (LED) capable of emitting infra-red light; and the light receiver 118 is also a LED capable of receiving infra-red light.

Figure 2:
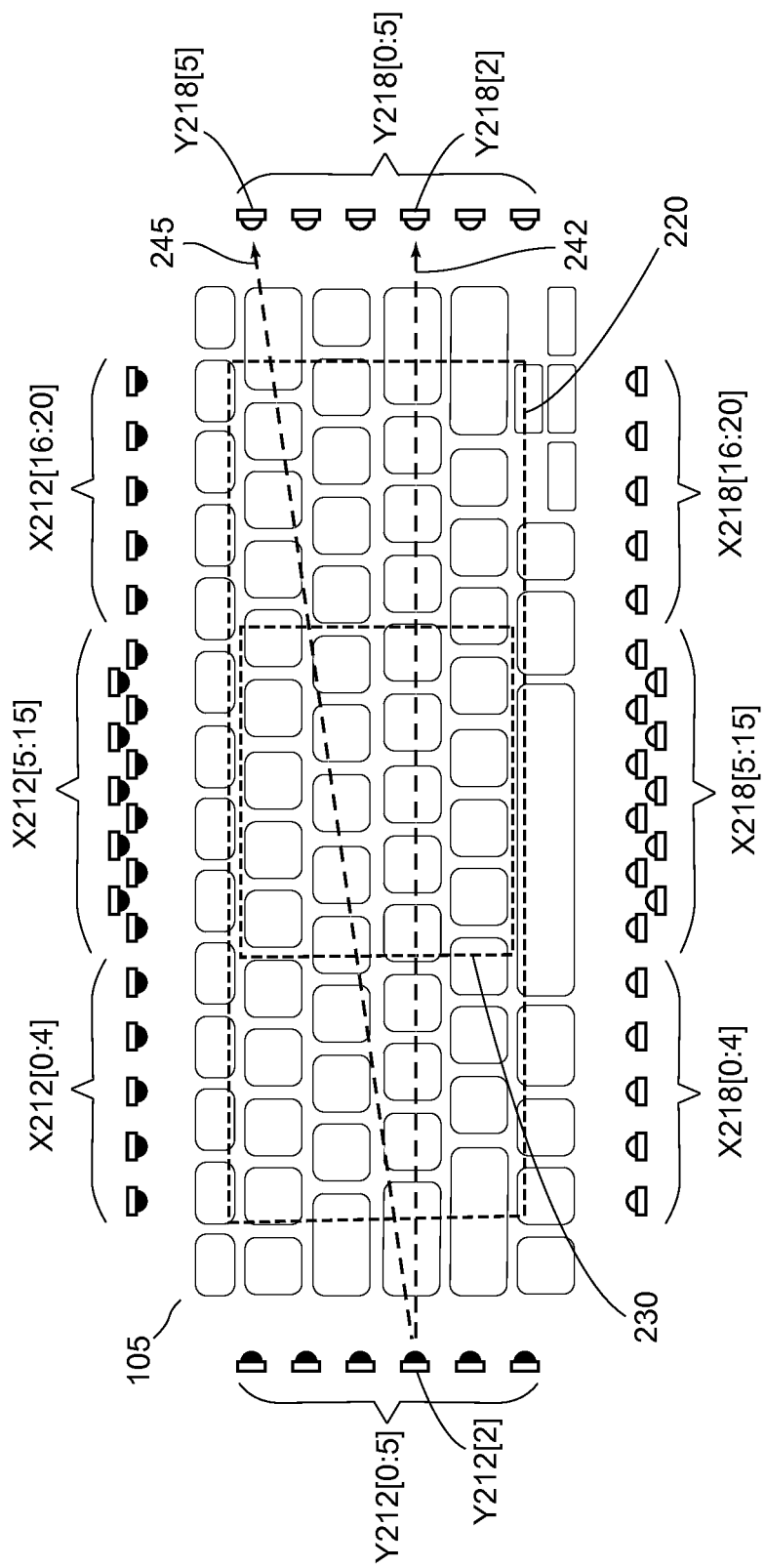
FIG. 2 illustrates layout arrangement of a keyboard-and-mouse combo device according to an embodiment of the present disclosure.

FIG. 2 illustrates layout arrangement of a keyboard-and-mouse combo device according to an embodiment of the present disclosure. A plurality of LED emitters X212[0:20] and a plurality of LED receivers X218[0:20] are disposed along a top edge and a bottom edge, respectively, of the keyboard keys 105. A plurality of LED emitters Y212[0:5] and a plurality of LED receivers Y218[0:5] are disposed along a left edge and a right edge, respective, of the keyboard keys 105. When unblocked, light emitted from the LED emitters X212[0:20] can be received by the LED receivers X218[0:20], and light emitted from the LED emitters Y212[0:5] can be received by the LED receivers Y218[0:5]. When an object, such as a finger, comes into contact with the surface area 220 of the keys 105, certain light beams in both the X direction and Y direction will be blocked, hence the touch coordinates can be detected.

As shown in FIG. 2, the LED emitters X212[5:15] and the corresponding LED receivers X218[5:15] are placed more closer to each other, therefore, the surface area 230 covered by these emitter-and-receiver pairs has high resolution in detecting the touch on the surface of the keys 105. In other embodiments, the high resolution area 230 may be shifted to either left or right from the center of the keyboard 105. There may even be two of such high resolution area 230 arrange, one on the left and the other on the right of the keyboard 105.

As shown in FIG. 2, an orthogonal light beam 242 and a diagonal light beam 245 are emitted from the LED emitter Y212[2], and received by the LED receivers Y218[2] and Y218[5], respectively. Combining the orthogonal and diagonal detections may also enhance detection resolution. Apparently, the orthogonal and diagonal detection and combination can also be applied to the X direction.

Figure 3:
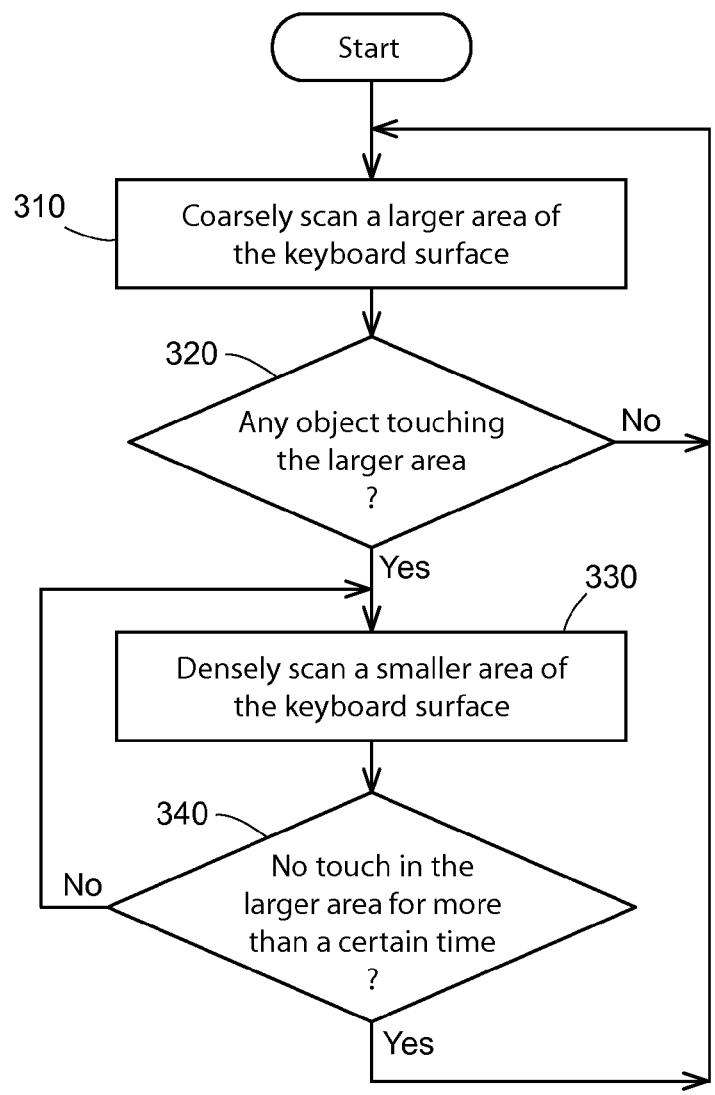
FIG. 3 is a flow-chart diagram illustrating an exemplary operation of a keyboard-and-mouse combo device according to an embodiment of the present disclosure.

FIG. 3 is a flow-chart diagram illustrating an exemplary operation of a keyboard-and-mouse combo device according to an embodiment of the present disclosure. In the beginning, the keyboard-and-mouse combo device coarsely scan the larger area 220 as shown in FIG. 2 by sequentially activating the LED emitter-and-receiving pairs in step 310. In one embodiment, the coarse scanning is represented by detecting only orthogonal light beams, such as light beam 242 in FIG. 2. In another embodiment, the coarse scanning is represented by activating every other LED emitter-and-receiver pair, particularly in the high resolution area 230 in FIG. 2. For instance, after activating LED emitter X212[5] and LED receiver X218[5], LED emitter X212[7] and LED receiver X218[7] are subsequently activated. In other embodiments, the coarse scanning is represented by slowing down the scanning pace, i.e., the time interval between two sequential LED activations is relatively longer than normal.

Referring to FIG. 3 again, the scanning detects if there is one or more touches on the keyboard surface 105 in step 320. If a touch is detected, the keyboard-and-mouse combo device will start to densely scan the high resolution area 230 as shown in FIG. 2 in step 330. In one embodiment, the dense scanning is represented by sequentially activating every LED emitter-and-receiver pairs corresponding to the high resolution area 230. In another embodiment, the dense scanning is represented by combining both orthogonal and diagonal light beams in detection. In other embodiments, the scanning pace may be faster than normal.

In embodiments, while densely scanning the high resolution area 230, the keyboard-and-mouse combo device still performs coarse scanning on the area 220 that is outside of the high resolution area 230. While dense scanning may result in higher resolution and more dynamic touch coordinate detection, it would be desirable to reduce power consumption by the keyboard-and-mouse combo device whenever possible. Therefore, in step 340, when the keyboard 105 experiences no touch for a predetermined period of time, the operation will be directed back to coarse scanning. Otherwise the operation remains in dense scanning. In embodiments, the predetermined period of time is adjustable by a computer user, just like the time to enter a screen saver of a computer display is adjustable by a computer user.

Figure 4:
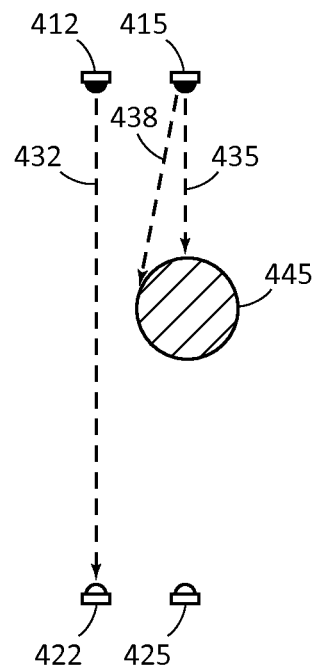
FIG. 4 illustrates how diagonal scanning can improve accuracy of the touch sensing system shown in FIG. 2.

FIG. 4 illustrates how diagonal scanning can improve accuracy of the touch sensing system shown in FIG. 2. For illustration purpose, two light emitters 412, 415, and two light receivers 422, 425 of the touch sensing system is shown in FIG. 4. Light beams 432 and 435 are orthogonal light beams between the light emitters 412, 415 and the light receivers 422, 425, respectively. Light beam 438 is a diagonal light beam between the light emitter 415 and the light receiver 422. A touching object 445 has an edge situated somewhere between the orthogonal light beams 432 and 435, and blocks the diagonal beam 438.

As shown in FIG. 4, if a scanning utilizing only the orthogonal light beams 432 and 435, the location of the edge of the object 445 can only be recognized as corresponding to either the light beam 432 or the light beam 435, and not locations in between the orthogonal light beams 432 and 435. If a scanning utilizing both the orthogonal and the diagonal light beams 432, 435 and 438, the location of the touching object 445 as shown in FIG. 4 can be recognized with the assistance of the diagonal light beam 438. Therefore, adding diagonal light beam detection can increase accuracy of the touch sensing system without physically increase the density of light emitter-receiver pairs. However, the location of the touching object 445 has to be calculated from the distance between the light emitter-receiver pair and the pitch of the activated light receivers.

Figure 5:
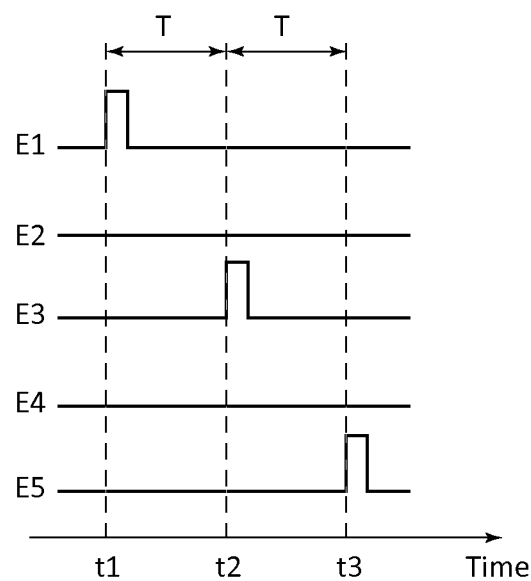
FIG. 5 illustrates a scheme of skipping activations of every other light emitting device during a cycle of scanning.

FIG. 5 illustrates a scheme of skipping activations of every other light emitting device during a cycle of scanning. Light emitters E1, E2, . . . E5 are sequentially placed in a line. A pulse generator (not shown) periodically generates a pulse with a time interval (T). The pulse is sequentially supplied to light emitters E1, E3 and E5, and light emitter E2 and E4 are skipped. If the pulse interval time is fixed, the scanning cycle time can be reduced by half for skipping every other light emitter. On the other time, the scanning cycle time instead can be fixed, while the pulse interval time is increased, so that power consumption by the touch sensing system can be reduced. However, by skipping activation of every other light emitting device during a scanning cycle, the accuracy of the touch sensing system will be reduced. Therefore, such scanning method should only be used when no touch have been detected.

Figure 6:
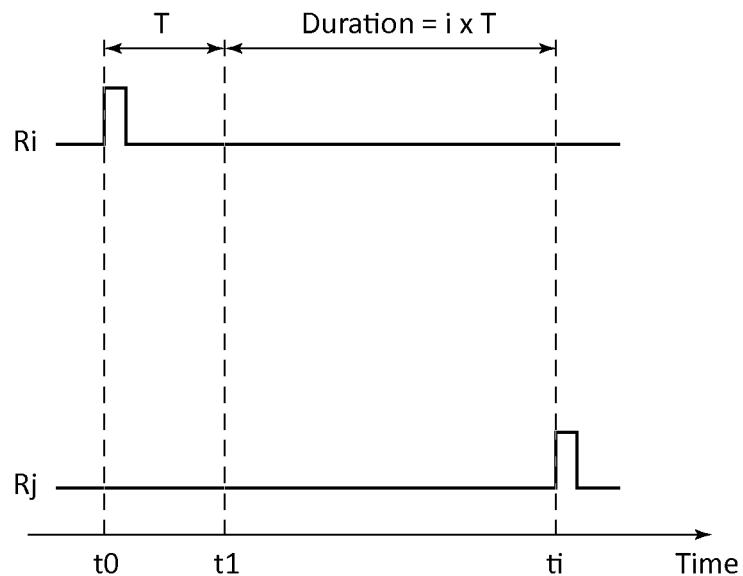
FIG. 6 illustrates a scheme of tracking time duration of no-touch on the touch sensing system of FIG. 2.

FIG. 6 illustrates a scheme of tracking time duration of no-touch on the touch sensing system of FIG. 2. During a particular scanning cycle between time t0 to time t1, a light receiver Ri detects emitted light being blocked at time t0. Then if no light receiver detects any emitted light being blocked during an immediately subsequent scanning cycle after time t1, a timer (not shown) will be triggered at the end of the immediately subsequent scanning cycle. In embodiments, the timer has a predetermined count-down value (T), and after the timer counts to zero, the touch sensing system will be automatically switched from dense scanning to coarse scanning for lowering power consumption, as there is no need for detection accuracy during the no touch period. Such count-down value (T) can be exemplarily set at 10 seconds and can be reset by a user to another value. Apparently, a count-up timer can function in the same way as a count-down timer. In other embodiments, the timer can be replaced with a cycle counter. Because the time duration of each scanning cycle is known, counting scanning cycles has the same effect as the aforementioned timer.

Referring to FIG. 6 again, if a blocked emitted light is detected by a light receiver Rj at time ti, the touch sensing system will be immediately switched to dense scanning mode if it previously operates in coarse scanning mode.

Figure 7:
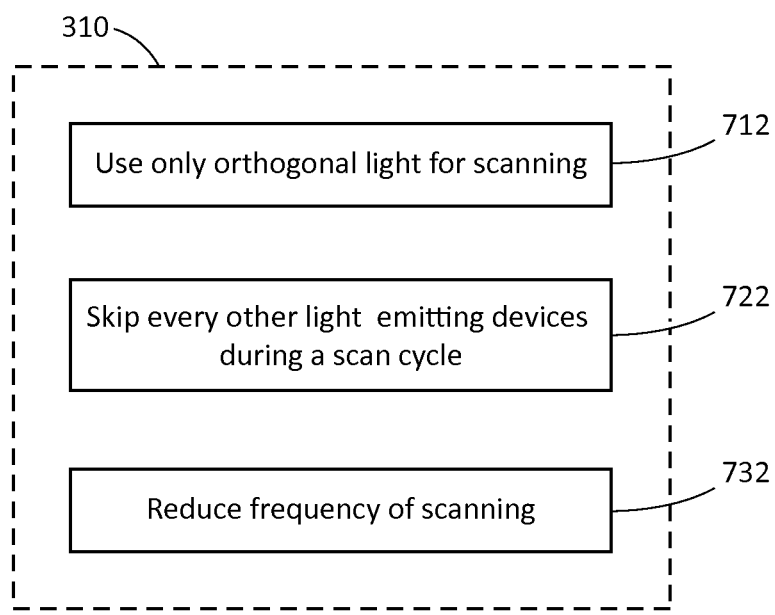
FIG. 7 illustrates various options of coarse scanning.

FIG. 7 illustrates various options of coarse scanning 310. One option is to utilize only orthogonal light beams for touch detection in item 712, so that fewer number of light receivers will be activated, and the diagonal light beam calculations will be put to rest. Another option, shown in item 722, is to skip activating every other light emitters for a scanning cycle as illustrated in FIG. 5. Yet, another option, shown in item 732, is to reduce the scanning frequency, i.e., every scanning cycle takes longer time. The above options for coarse scanning can be used individually or in combination.

Figure 8:
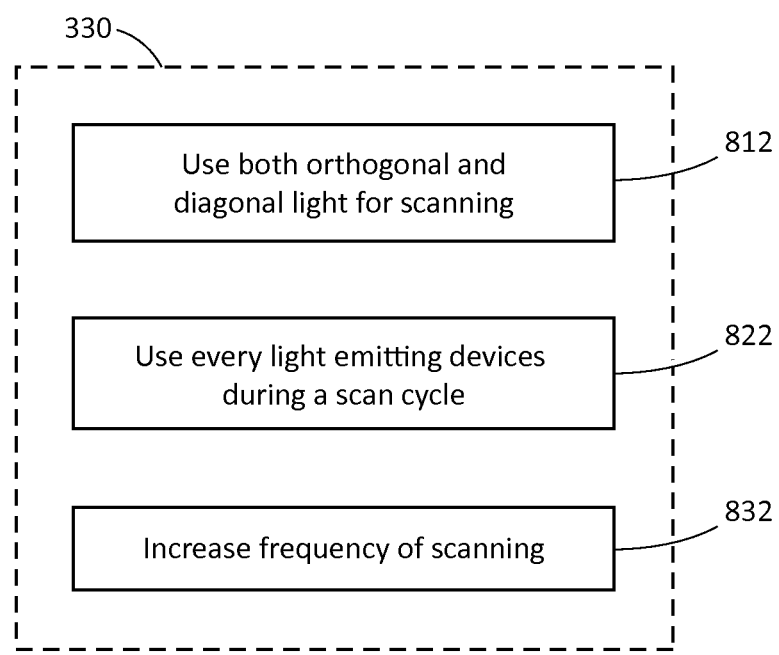
FIG. 8 illustrates various options of dense scanning

FIG. 8 illustrates various options of dense scanning 330. One option is to utilize both orthogonal and diagonal light beams for touch detection in item 812, so that the touch detection can be more accurate. Another option, shown in item 822, is to use every light emitter during a scanning cycle. Yet, another option, shown in item 832, is to increase the scanning frequency, i.e., making every scanning cycle take shorter time. The above options for dense scanning can be used individually or in combination.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A computer input method comprising:
   providing a plurality of light emitting and receiving device pairs for detecting one or more touches on a first area of a computer keyboard;
   coarsely scanning the first area using the plurality of light emitting and receiving device pairs when no contact on the first area being detected; and
   densely scanning a second area of the computer keyboard using a subset of the plurality of light emitting and receiving device pairs when one or more contact on the first area being detected, the second area being smaller than and situated within the first area.

2. The computer input method of claim 1, wherein the plurality of light emitting and receiving device pairs are situated near edges of the computer keyboard with one group of the plurality of light emitting and receiving device pairs arranged in a first direction and another group of the plurality of light emitting and receiving device pairs arranged in a second direction, the first direction being orthogonal to the second direction.

3. The computer input method of claim 1, wherein the coarse scanning includes using only orthogonal light beams for detection.

4. The computer input method of claim 1, wherein the coarse scanning includes skipping activations of one or more of the plurality of light emitting device pairs during a cycle of scanning.

5. The computer input method of claim 1, wherein the coarse scanning includes using a scanning pace that is slower than that is used during the dense scanning.

6. The computer input method of claim 1, wherein the dense scanning includes using both orthogonal and diagonal light beams for detection.

7. The computer input method of claim 1 further comprising counting a single stretch of time during which no contact on the first area of the keyboard being detected, and entering the coarse scanning when the single stretch of time being longer than a predetermined length.

8. The computer input method of claim 7, wherein the predetermined length of time is adjustable by a computer user.

9. A computer input method comprising:
   providing a plurality of light emitting and receiving device pairs for detecting one or more touches on a first area of a computer keyboard;
   coarsely scanning the first area using the plurality of light emitting and receiving device pairs when no contact on the first area being detected;
   densely scanning a second area of the computer keyboard using a subset of the plurality of light emitting and receiving device pairs when one or more contact on the first area being detected, the second area being smaller than and situated within the first area;
   counting a single stretch of time during which no contact on the first area of the keyboard being detected; and
   switching from the dense scanning to the coarse scanning when the single stretch of time being longer than a predetermined-length.

10. The computer input method of claim 9, wherein the plurality of light emitting and receiving device pairs are situated near edges of the computer keyboard with one group of the plurality of light emitting and receiving device pairs arranged in a first direction and another group of the plurality of light emitting and receiving device pairs arranged in a second direction, the first direction being orthogonal to the second direction.

11. The computer input method of claim 9, wherein the coarse scanning includes using only orthogonal light beams for detection.

12. The computer input method of claim 9, wherein the coarse scanning includes skipping activations of one or more of the plurality light emitting device pairs during a cycle of scanning.

13. The computer input method of claim 9, wherein the coarse scanning includes using a scanning pace that is slower than that is used during the dense scanning.

14. The computer input method of claim 9, wherein the dense scanning includes using both orthogonal and diagonal light beams for detection.

15. The computer input method of claim 9, wherein the predetermined length of time is adjustable by a computer user.

* * * * *